Jan. 23, 1968   R. S. LANGDON   3,365,230
ADJUSTABLE STAKE BODY STRUCTURE
Filed Oct. 22, 1965   5 Sheets-Sheet 1

INVENTOR
REESE S. LANGDON

BY *Shanley & O'Neil*

ATTORNEYS.

Jan. 23, 1968   R. S. LANGDON   3,365,230
ADJUSTABLE STAKE BODY STRUCTURE
Filed Oct. 22, 1965   5 Sheets-Sheet 2
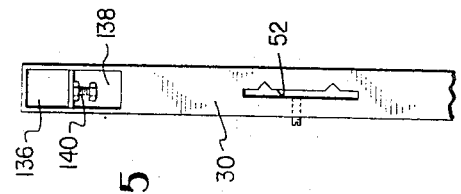
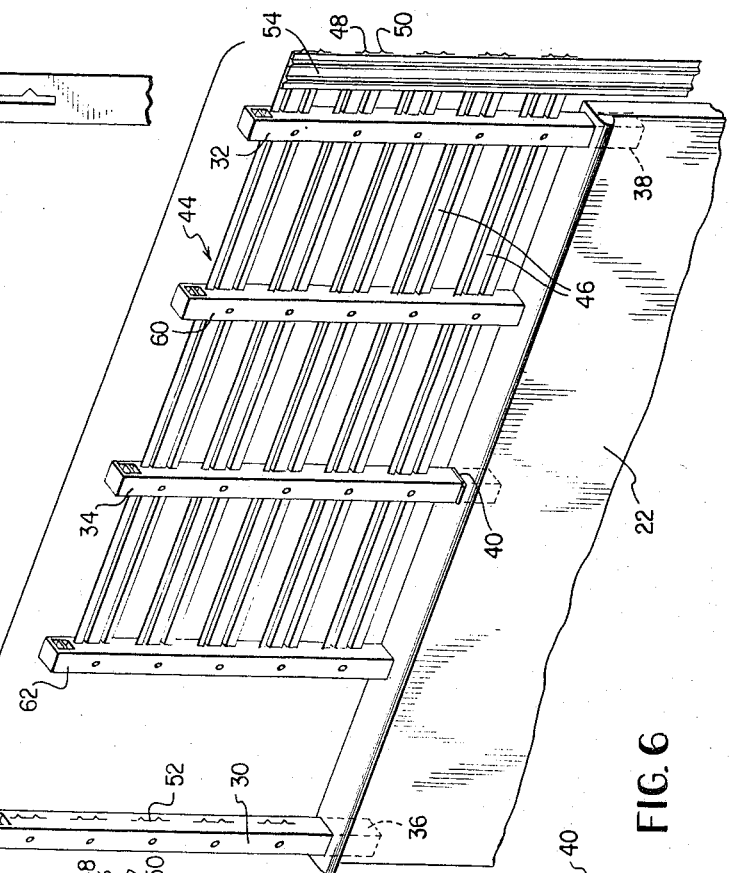
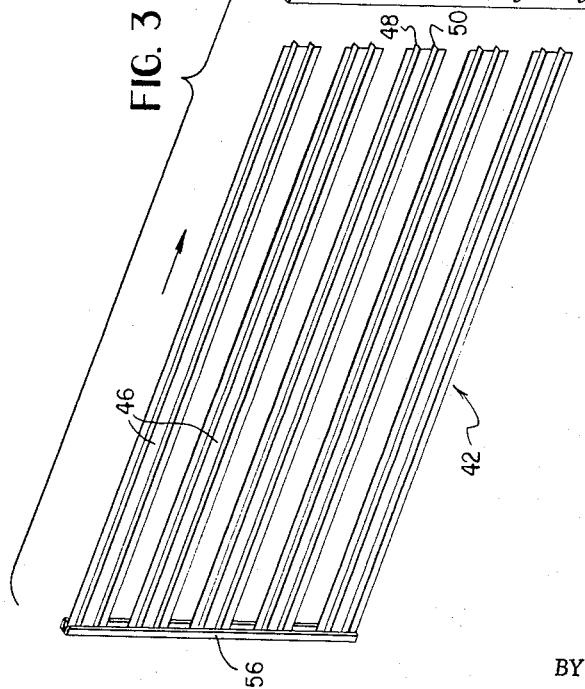
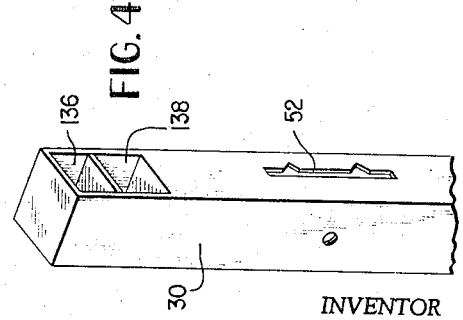
INVENTOR
REESE S. LANGDON
BY *Shanley & O'Neil*
ATTORNEYS

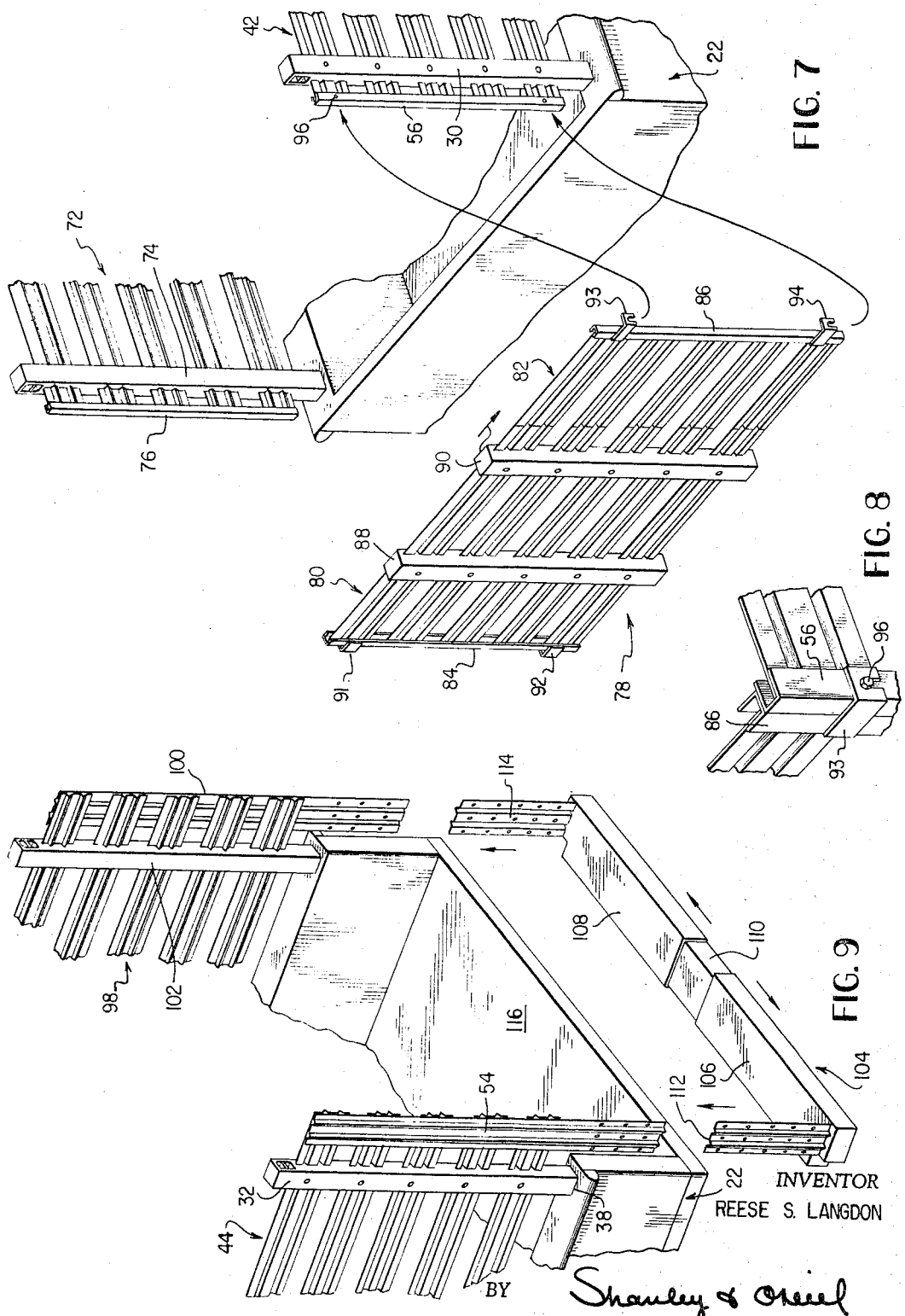

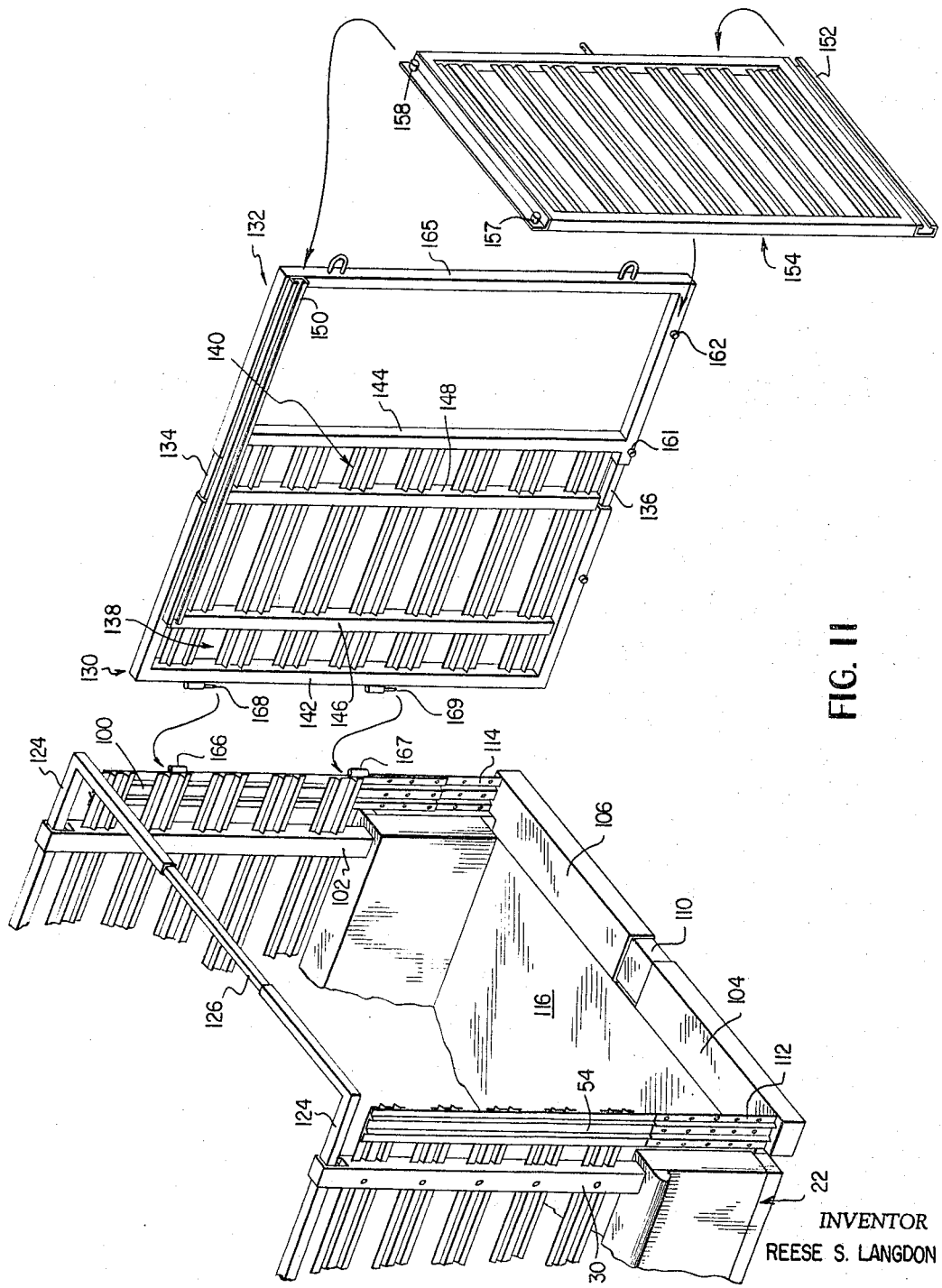

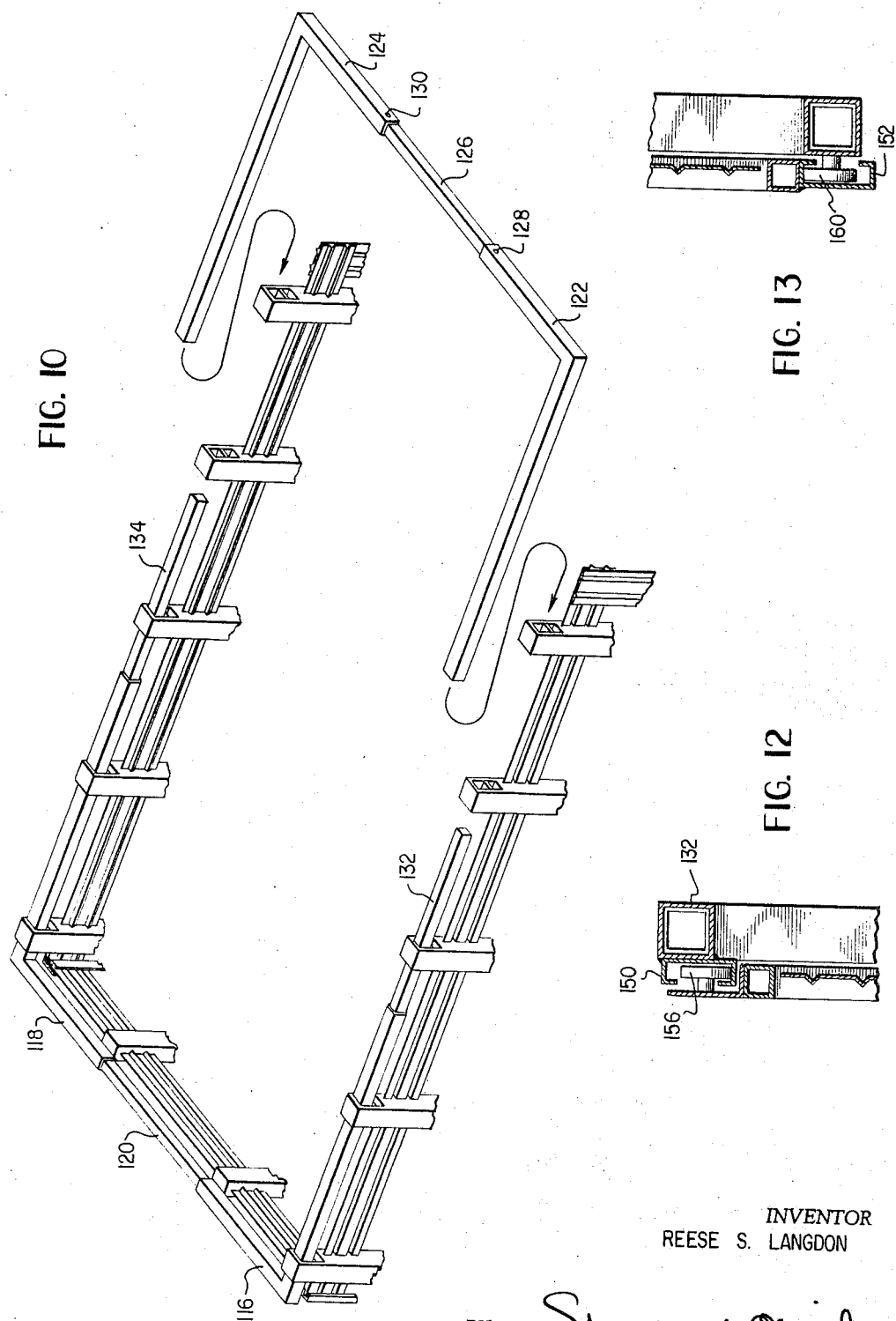

United States Patent Office 3,365,230
Patented Jan. 23, 1968

3,365,230
ADJUSTABLE STAKE BODY STRUCTURE
Reese S. Langdon, 3503 W. 7th St.,
Texarkana, Tex. 75501
Filed Oct. 22, 1965, Ser. No. 500,865
13 Claims. (Cl. 296—3)

ABSTRACT OF THE DISCLOSURE

Dimensionally adjustable, metallic, demountable stake body structure and tail gate assembly for a vehicle are provided. The stake body includes nestable slats which are interlocking along longitudinal overlapping portions to provide structural stability and strength. Support uprights for the stake body are adapted to be positioned in the varying pocket locations encountered in differing vehicles. The tail gate assembly includes telescopically interfitting threshold members and provides for swinging door or sliding door access.

---

The present invention is concerned with dimensionally adjustable, demountable stake body structure for pick-up trucks, trailers, and other vehicles.

Most stake bodies must be tailormade for a particular vehicle. This is an expensive addition when buying a truck, for example, and a time-consuming delay before the truck can be put to use. In addition, the useful life of the stake body and the truck are seldom, if ever, the same, so that replacing one or the other is always complicated by this fact.

Practically all users of stake bodies prefer demountable versions to permit a truck, or other vehicle, to be used for a variety of hauling jobs. With demountable features, even tailormade stake bodies are seldom made strong enough for hauling livestock, such as cattle. Therefore, bracing features must be added which, in effect destroy the demountable aspects of the stake body. Another approach of the prior art has been adjustable pipe racks which attach to pick-up truck bodies, but these do not help in solving the problem of structural stability with stake bodies. In practice, the desired structural stability has been attainable in the past only with tailormade, fixed installation stake bodies.

The main objective of the present invention is to provide dimensionally adjustable, all-metal, demountable stake body structure with novel interlocking features providing structural stability and strength suitable for hauling any type of livestock or handling any stake body hauling job. In other words, the structural stability and strength formerly obtainable only with tailormade, fixed installation stake bodies.

This objective is achieved with structure having novel interlocking features which provide structural stability along the length of perimeter walls of a stake body and, additionally, which provide dimensional stability along upper ends of a stake body wall comparable to the stability provided by a vehicle bed.

A novel tailgate assembly, which increases the usable floor space of a vehicle, is also provided. Included in this tailgate assembly are height-adjustment features which assure level access to vehicle flooring, regardless of the type of vehicle.

The accompanying drawings will be referred to for a more detailed and specific description of the invention, including other unique features and advantages. In these drawings:

FIGURE 3 is a fragmentary, exploded, perspective view showing a method of assembling a side wall of the embodiment of FIGURE 1;

FIGURE 4 is a perspective view of the upper portion of an upright member forming a part of the embodiment of FIGURE 1;

FIGURE 5 is a side elevation of the upright member shown in FIGURE 4;

FIGURE 6 is a perspective view of an upright member adaptor for use with the embodiment of FIGURE 1;

FIGURE 7 is a fragmentary, exploded, perspective view showing a method of assembling a front wall for the embodiment of FIGURE 1;

FIGURE 8 is a fragmentary, perspective view showing attachment structure for the front wall of FIGURE 7;

FIGURE 9 is a fragmentary, exploded, perspective view showing a method of assembling a tailgate threshold forming a part of the present invention;

FIGURE 10 is a fragmentary, perspective view showing a method of assembling upper stabilizing structure for the embodiment of FIGURE 1;

FIGURE 11 is a fragmentary view showing a method of assembling the tailgate assembly shown in FIGURE 2;

FIGURE 12 is a fragmentary, cross-sectional view taken along the lines 12—12 of FIGURE 2; and FIGURE 13 is a fragmentary, cross-sectional view taken along the lines 13—13 of FIGURE 2.

Figure 1:
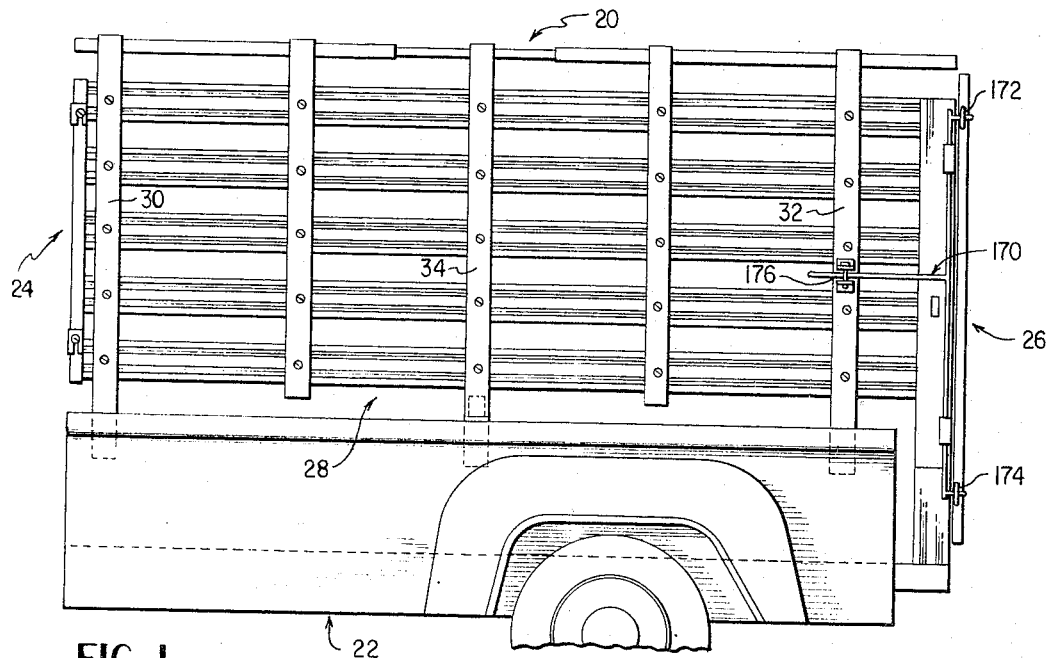
FIGURE 1 is a side elevational view of a stake body embodying the invention.

FIGURE 1 shows a demountable stake body 20 mounted on truck bed 22. The stake body has a forward wall assembly 24, a tailgate assembly 26, and sidewall assembly 28 extending between the forward wall and tailgate assemblies. Stake body 20 is supported on truck body 22 by corner posts 30, 32 and an intermediate post 34.

Similar supports and sidewall assembly structure are provided on the remaining side elevation of the vehicle.

Referring to FIGURES 1 and 3, the sidewall 28 is assembled by first mounting corner post 30 in pocket 36, corner post 32 in pocket 38, and intermediate post 34 in adaptor 40.

Intermediate post 34 is optional since many smaller vehicles provide no access at this point. If an aperture only is provided at any of the post positions of vehicle body 22, adaptor 40 can be used to support a post and provide lateral stability.

Sidewall assembly 28 includes two longitudinally extended, rectangularly shaped slotted sections 42 and 44. Each includes a plurality of elongated slats 46 with grooves 48 and 50 extending lengthwise along each slat.

A series of open passages 52 are spaced along the length of the upright members 30, 32, and 34. These passages, shown in more detail in FIGURES 4 and 5, have a configuration matching that of slats 46 and providing support for the slats at a plurality of points, including grooves 48 and 50.

Individual slats 46 of the rearward slotted section 44 are held together by vertical framing member 54. Individual slats 46 of the forward slotted section 44 are held together by vertical member 56. The individual slats may be welded or otherwise secured to these vertical members.

In order to erect a sidewall, corner uprights 30 and 32 are placed in the pockets 36 and 38, respectively, and in installations where an intermediate post can be used, intermediate post 34 is mounted in a pocket, if provided, or with adaptor 40. Rearward slotted section 44 is slid through rear corner upright 32 with the individual slats 46 fitting through the open passages 52 provided in corner upright 32. After passage through corner upright 32, individual slats are passed through a movable upright 60, which has open passages 52 as described above. The slats then extend through intermediate upright 34 toward forward corner upright 30. A movable upright 62 with open passages 52 is fitted over the ends of the individual slats of the rear slotted section 44.

Forward slotted section 42 is then fitted through forward corner upright 30 with the individual slats 46 fitting through the passages 52. The ends of the individual slats then pass through movable upright 62, through intermediate upright 34 and into the rearward movable upright 60.

As shown in FIGURE 5, each passage 52 includes a locking bolt 64. After the forward slotted section 42 and rearward slotted section 44 are in place, their distal ends are covered by movable uprights 60 and 62, respectively, and locking bolt 64 in each passage 52 is set. The slats of forward slotted section 42 overlap the slats of rearward slotted section 44 between the movable uprights 60 and 62. This makes an important contribution to the invention, since in addition to the stability provided by locking individual slats 46 in matching configuration passages 52 of the uprights, the slats are interlocked in overlapping regions by groove structure 48 and 50, thus providing additional longitudinal stability.

Pockets 36 and 38 may be of differing depths on differing vehicles, in which case adaptor 40 can be used for all the upright members. Adaptor 40 is fitted onto an upright before insertion in a pocket or other opening and stop 66 will come to rest at the upper edge of the opening. Setscrews can be provided to interlock the adaptor 40, or the upright members, or both, with the vehicle.

Mounting of the remaining sidewall of a stake body is identical to that described above, using identical parts adapted for that side of the vehicle.

Referring to FIGURE 7, a partial view of a forward portion of the stake body and truck bed of FIGURE 1 is shown. On the left side of the vehicle, slotted section 42 is mounted in corner upright 30, as described above. A right side forward slotted section 72 is similarly mounted in forward corner upright 74. The forward end of slotted section 72 includes a vertical member 76, similar to vertical member 56.

Forward wall 78 includes two slotted sections, 80, 82. Individual slats of slotted sections 80 and 82 are similar to those described in relation to the sidewalls and include similar longitudinal grooves. The individual slats of the slotted sections 80 and 82 are held together by vertical members 84 and 86, respectively. The slats overlap between movable uprights 88 and 90. Open passages and setscrews, as described earlier in relation to sidewall structure, are provided in movable uprights 88 and 90 to interlock distal ends of slotted sections 80 and 82. The length of forward wall 78 is adjusted to the width of the vehicle.

Vertical members 84 and 86 on the forward wall include interlocking hook members 91, 92, 93, 94. Locking pins for these hook members are provided on vertical members 56 and 76 for attaching forward section 78 to the sidewall sections. For example, hook member 93 fits over locking pin 96 as shown in FIGURE 8.

Referring to FIGURE 9, right rear slotted section 98 includes vertical framing member 100 interconnecting the individual slats of that slotted section. Vertical framing member 100 is positioned to the rear of right corner upright 102 in the same way that vertical framing member 54 is positioned to the rear of the left corner upright 32. Tailgate framing also includes threshold member 104 consisting of sections 106 and 108, which are interfitted telescopically by section 110.

At opposite ends of threshold 104 are threshold uprights 112 and 114. These threshold uprights include apertures as shown. Vertical framing members 54 and 100 include matching apertures. After adjusting the length of the threshold 104 to the width of the body, it is held flush with truck bed 116; left threshold upright 112 is secured to vertical framing member 54 and right threshold upright 114 is secured to vertical framing member 100 with lock bolts in aligned apertures. This feature of the invention is important, since the threshold adds length to a truck bed flooring, permits flush mounting with the truck bed flooring and eliminates assembly and use problems complicated by the partial tailgates provided on some trucks. With the present invention, such tailgates need not be used.

After the sidewalls and forward wall of a stake body are in position, the upper ends of these walls are interlocked using stabilizing means as shown in FIGURE 10. The stabilizing means include section 116, extending along the forward wall and sidewall at left front corner of the vehicle, and section 118, extending along the forward wall and sidewall at the right front corner of the vehicle. Sections 116 and 118 are telescopically interfitted at the forward end of the vehicle, with section 120. At the rearward end of the vehicle section 122, which extends along the rear wall and sidewall at the left rear corner of the vehicle, and section 124, which extends along the rear wall and sidewall of the structure at the rear right corner of the vehicle, are telescopically interfitted with section 126. At the side walls sections 132 and 134 are provided for interlocking sections 116 and 122, and sections 118 and 124, respectively. Setscrews, such as 128 and 130 shown at the rearward end of the stabilizing means, are used for interlocking the various sections.

The stabilizing members are also interlocked with the corner, intermediate, and movable uprights. FIGURES 4 and 5 show means for interlocking stabilizing members and uprights. Upper chamber 136 receives a stabilizing member, and lower chamber 138 provides access to setscrew 140 for locking the stabilizing member with the upright.

The wall structure described is demountable and dimensionally adjustable about the perimeter of a vehicle and provides structural stability at each intersection of assembled parts. The lower ends of the structure are held in fixed positional relationship by truck body 22. The upper ends of the structure are held in fixed positional relationship by stabilizing members joined to the upper ends of the corner, intermediate, and movable uprights. Individual slats are held in fixed relationship to each other and to upright members by setscrew interlocking means.

The structure shown can be used on vehicles with "pick-up" type bodies. Flat bed vehicles would use structure embodying the same principles, however a portion of the side and front walls, at their lower ends, could be made solid rather than slotted.

The present invention includes novel tailgate structure with demountable and dimensionally adjustable features. The sidewalls and tailgate framing members assembled as described above provide structure as shown in FIGURE 11 for receiving and supporting tailgate structure. Swinging movement or sliding door access are combined in the invention.

Figure 2:
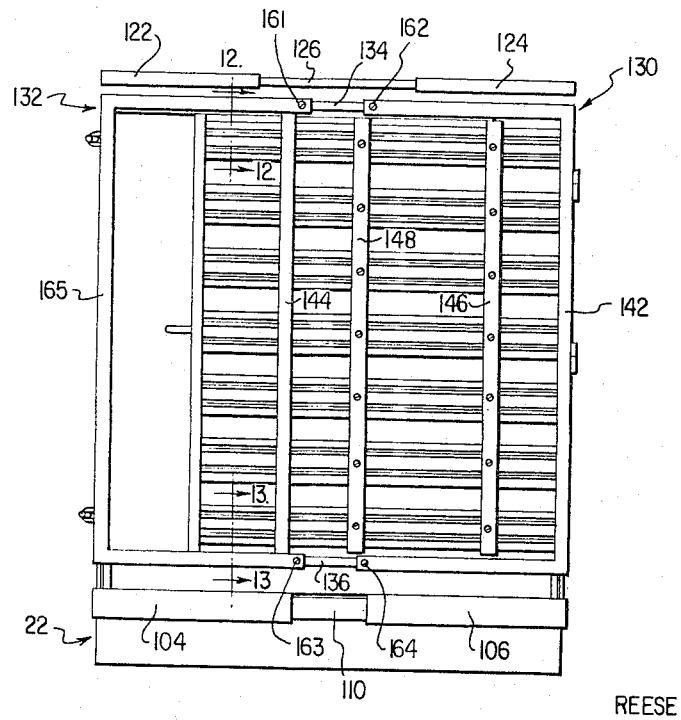
FIGURE 2 is an elevational view of a tailgate assembly forming part of the invention, showing a sliding door structure partially open.

Referring to FIGURES 2 and 11, the tailgate includes structural members 130 and 132 which are telescopically interfitted by means of sections 134 and 136. Individual slats, as described earlier, are secured to vertical member 142 to form slotted section 138, and individual slats are secured to vertical member 144 to form slotted section 140. Distal ends of the slotted sections are held by movable upright members 146 and 148. Individual members of this structure are secured together by setscrews as described earlier in relation to sidewall structure.

As shown in FIGURES 11, 12, and 13, slotted guideway 150 is secured to framing member 132 at the upper end of the door structure, and slotted guideway 152 is secured to the lower end of the sliding door 154. Support wheels, such as 156 in FIGURE 12, are provided on support posts 157 and 158 at the upper end of sliding door 154, as shown in FIGURE 11. Similar support wheels, such as 160 in FIGURE 13, are provided on support posts 161 and 162 shown at the lower end of framing member 132 in FIGURE 11.

After the structural members 130 and 132 are dimensionally adjusted to the width of the vehicle, the distal ends of slotted sections 138 and 140 are secured by movable uprights 146 and 148. Members 130 and 132 are telescopically interlocked by means of setscrews 161, 162, 163, and 164. Sliding door 154 closes the opening between vertical members 144 and 165 and is supported in the guideways described above.

Tailgate vertical framing member 100 includes female hinge portions 166 and 167. The tailgate, at vertical member 142, includes male hinge parts 168 and 169. By means of these hinge parts, the tailgate is swing-mounted on the sidewall structure and can be locked in closed position by locking structure 170, shown in FIGURE 1. Locking structure 170 locks the door at 172 and 174, and provides safety latch 176.

The stake body structure described can be manufactured from steel, aluminum, or other suitable metals or alloys. The structure is dimensionally adjustable, is demountable, and is structurally sound and stabilized due to interlocking at all intersections of vertical and horizontal elements. Means for interlocking the various elements other than those described can be used within the teachings of the invention. Various other modifications can be made without departing from the scope of the invention as set forth in the appended claims.

What is claimed is:

1. Prefabricated stake body structure which is dimensionally adjustable for circumscribing a vehicle having a forward end, rearward end, and sides extending between the forward and rearward ends comprising
   four elongated corner uprights adapted to be mounted substantially vertically at forward and rearward corners of the vehicle and supported by the vehicle at their lower longitudinal ends,
   stabilizing means for interconnecting the four elongated corner uprights at their upper longitudinal ends, the stabilizing means including elongated members extending between the corner uprights along the forward and rearward ends and sides of the vehicle,
   forward endwall means including two slotted wall sections adapted to be mounted in a substantially vertical plane across the forward end of the vehicle with each slotted section being adapted to be secured at one vertical end to the vehicle with distal ends of each slotted section being joined to each other in overlapping relationship,
   sidewall means including slotted wall sections adapted to be mounted along each side of the conveyance with each sidewall means including a forward and a rearward slotted section, the forward slotted section being adapted to be secured at one of its vertical ends to a forward corner of the vehicle and extend rearwardly along one side of the vehicle, the rearward slotted section being adapted to extend forwardly through a rear corner post along the one side of the vehicle to be joined in overlapping relationship with the forward slotted section and to extend rearwardly from the rearward corner post in overhanging relationship to the rearward end of the vehicle,
   tailgate framing members adapted to be mounted substantially vertically and secured to and supported by overhanging portions of the rearward slotted sections,
   an adjustable-length threshold member adapted to be mounted horizontally along the rearward end of the conveyance,
   means for interlocking the tailgate framing members and the threshold member, the interlocking means permitting heightwise adjustment of the threshold member to establish substantially coplanar relationship between vehicle flooring and the threshold member, and
   tailgate means adapted to be hinged to one of the vertical tailgate framing members for swinging movement to open and close the rearward end of the vehicle.

2. The structure of claim 1 in which the slotted wall sections of the forward end wall and sidewall means include a series of elongated slats with each slat including at least one nesting groove extending along its length for interlocking with a similar nesting groove when slotted sections are joined in overlapping relationship.

3. The structure of claim 2 in which the corner uprights define passages for receiving individual slats of the slotted sections and include locking means for securing individual slats to the corner uprights.

4. The structure of claim 1 in which the corner uprights include means at their upper longitudinal ends for interlocking the stabilizing means and the corner uprights.

5. The structure of claim 4 in which the elongated members of the stabilizing means interfit telescopically and further including means for interlocking the elongated members at locations intermediate the corner uprights.

6. The structure of claim 1 in which the tailgate means includes two slotted sections adapted to be joined in overlapping relationship to permit adjustment for closing a portion of the rearward end of the vehicle and a sliding door means for closing the remaining portion of the rearward end of the vehicle.

7. The structure of claim 2 further including elongated sidewall upright member for receiving slats of the sidewall slotted sections, the elongated sidewall upright member being adapted to be mounted along a side of the vehicle intermediate a forward and rearward corner upright, and means for interlocking the sidewall slotted sections with the elongated sidewall upright member.

8. The structure of claim 7 further including adaptor means for receiving an elongated sidewall upright member at its lower longitudinal end.

9. The structure of claim 1 including means for interlocking the forward endwall means and sidewall means.

10. Prefabricated stake body structure which is dimensionally adjustable for circumscribing a vehicle having a forward end, rearward end, and sides extending between the forward and rearward ends comprising
    four elongated corner uprights adapted to be mounted substantially vertically at forward and rearward corners of the vehicle and supported by the vehicle at their lower longitudinal ends,
    stabilizing means for interconnecting the four elongated corner uprights at their upper longitudinal ends, the stabilizing means including elongated members extending between the corner uprights along the forward and rearward ends and sides of the vehicle,
    forward endwall means including two slotted wall sections adapted to be mounted in a substantially vertical plane across the forward end of the vehicle with each slotted section being adapted to be secured at one vertical end to the vehicle with distal ends of each slotted section being joined to each other in overlapping relationship,
    sidewall means including slotted wall sections adapted to be mounted along each side of the conveyance with each sidewall means including a forward and a rearward slotted section, the forward slotted section being adapted to be secured at one of its vertical ends to a forward corner of the vehicle and extend rearwardly along one side of the vehicle, the rearward slotted section being adapted to extend forwardly through a rear corner post along the one side of the vehicle to be joined in overlapping relationship with the forward slotted section and to extend rearwardly from the rearward corner post in overhanging relationship to the rearward end of the vehicle, and
    tailgate means adapted to be supported by the sidewall means in a substantially vertical plane across the rearward end of the vehicle.

11. Prefabricated stake body tailgate structure for a vehicle comprising tailgate framing members adapted to be mounted substantially vertically and supported by sidewall structure of a stake body, an adjustable-length threshold member adapted to be mounted horizontally along the rearward end of a vehicle, and means for interlocking the tailgate framing members and the threshold member, the interlocking means permitting heightwise adjustment of the threshold member to establish substantially coplanar relationship between vehicle flooring and the threshold member.

12. The tailgate structure of claim 11 further including two slotted sections adapted to be mounted in substantially coplanar relationship for closing a portion of a rear wall between sidewall structures of the vehicle, each slotted section including a plurality of elongated slats joined in substantially parallel, vertically spaced relationship at one of their longitudinal ends with distal ends of the elongated slats of one slotted section joined in overlapping relationship with distal ends of the elongated slats of the remaining slotted section by interlocking means permitting adjustment of length of overlap between the elongated slats.

13. The tailgate structure of claim 12 further including sliding door structure for closing the remaining portion of the rearwall between the sidewall structures of the vehicle.

References Cited
UNITED STATES PATENTS

| | | | |
|---|---|---|---|
| 838,653 | 12/1906 | Schuster | 296—3 |
| 1,879,299 | 9/1932 | Kehl | 296—7 |
| 2,164,448 | 7/1939 | Cohen | 296—3 |
| 2,210,516 | 8/1940 | Wheeler | 160—223 |
| 2,772,914 | 12/1956 | Hansen | 296—53 |

BENJAMIN HERSH, *Primary Examiner.*

PHILIP GOODMAN, *Examiner.*